Figure 1:
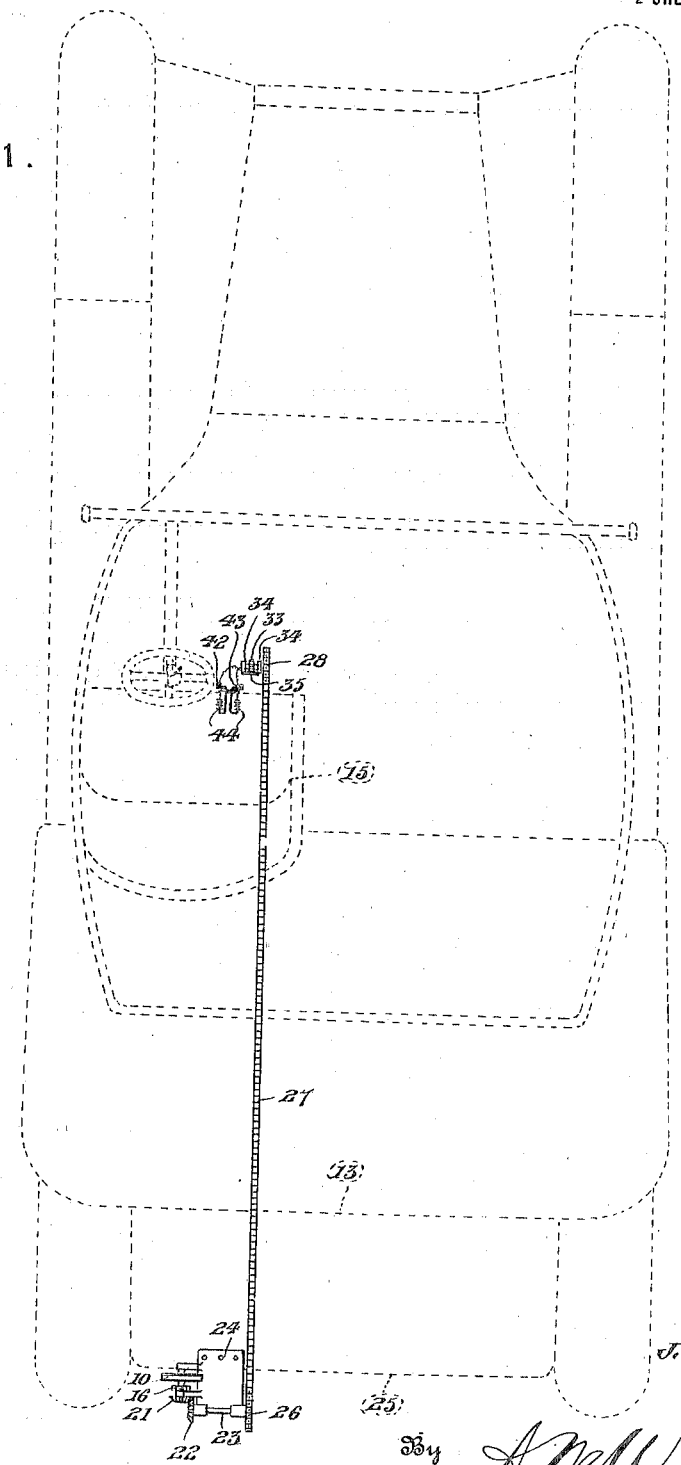

J. SOBOCINSKI.
AUTOMOBILE DIRECTION INDICATOR.
APPLICATION FILED APR. 26, 1919.

1,345,562.

Patented July 6, 1920.
2 SHEETS—SHEET 1.

Inventor
J. Sobocinski

By A. M. Wilson
Attorney

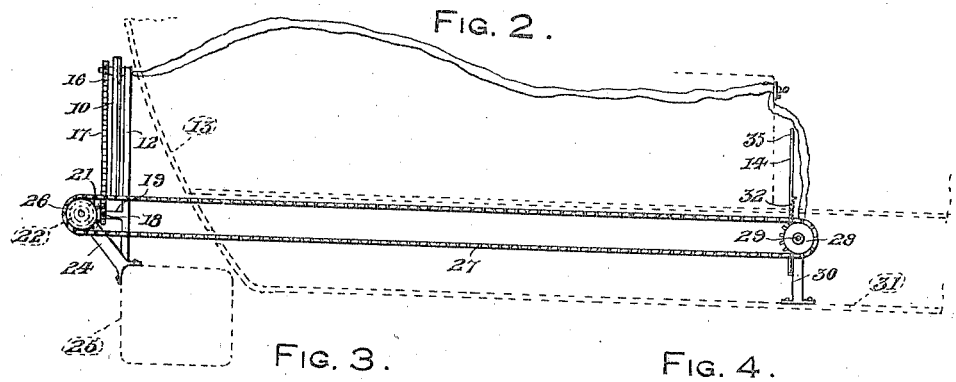

UNITED STATES PATENT OFFICE.

JOSEPH SOBOCINSKI, OF CUDAHY, WISCONSIN.

AUTOMOBILE DIRECTION-INDICATOR.

1,345,562.     Specification of Letters Patent.     Patented July 6, 1920.

Application filed April 26, 1919. Serial No. 292,797.

*To all whom it may concern:*

Be it known that I, JOSEPH SOBOCINSKI, a citizen of the United States of America, residing at Cudahy, in the county of Milwaukee and State of Wisconsin, have invented certain new and useful Improvements in Automobile Direction-Indicators, of which the following is a specification.

The primary object of the invention is the provision of a vehicle signal adapted for indicating the intended direction of future travel of the vehicle, the device being readily installed for use and easily operated when the occasion requires.

A further object of the invention is the provision of semaphore means upon a vehicle adapted for readily shifting to indicate the future direction of travel of the vehicle, illuminating means being provided for employment with the signal in the nighttime, the indicator being positive in its movements preferably positioned rearwardly of the vehicle and operable from a point adjacent the driver's seat.

With these general objects in view, the invention consists of the novel combination and arrangement of parts hereinafter described and illustrated in the accompanying drawing in which like reference characters indicate corresponding parts throughout the several views.

In the drawings,—

Figure 1 is a top plan view of the invention installed upon an automobile, the latter being indicated by dotted lines, Fig. 2 is a side elevation of the invention with a portion of the vehicle shown by dotted lines, Fig. 3 is a rear elevation of the invention with the indicating arm in its neutral depending position, Fig. 4 is a view similar to Fig. 3 with the arm elevated, indicating the future movement in one direction and illustrated by dotted lines in its opposite position, Fig. 5 is a side elevation of the operating means for the indicating arm, Fig. 6 is a front elevation thereof, Fig. 7 is an elevational view of the semaphore arm, and Fig. 8 is a view thereof partly in top plan and partly in longitudinal section with the illuminating means partially illustrated.

Referring more in detail to the drawings, my invention broadly consists of a semaphore arm 10 carried by a shaft 11 journaled in parallel uprights 12 at the rear of a vehicle body such as 13 and adapted for swinging horizontally in either direction by means of a vertical operating lever 14 positioned adjacent the driver's seat 15.

The shaft 11 is provided with a sprocket wheel 16 having a chain 17 passing thereover and over a similar sprocket 18 journaled in a bracket 19 adjacent the bottom of the upright 12. The sprocket 18 is carried by the shaft 20 having a pinion 21 thereon in constant mesh with a pinion 22 carried by a shaft 23 journaled in a bearing member 24, said bearing member being secured to a suitable support 25 at the rear of the vehicle at the point of attachment of the upright 12.

A sprocket wheel 26 upon the shaft 23 is provided with an operating chain 27 running thereover and also over a sprocket wheel 28 carried by the shaft 29 in an upright frame 30 mounted upon the floor 31 of the vehicle adjacent the driver's seat 15.

The operating lever 14 has a toothed portion 32 in constant mesh with a gear 33 upon said shaft 29 while suitable guides 34 are provided for the lever 14 upon said frame 30. The semaphore arm 10 is normally positioned depending as illustrated in Figs. 2 and 3 if the drawings with the lever 14 in its intermediate position as shown in Figs. 2, 5 and 6 thereof.

When it is intended to travel toward the left hand side of the vehicle, the lever 14 is grasped by its handle 35 and the lever 14 elevated thereby swinging the semaphore arm 10 to its horizontal position at the left side of the upright 12 as indicated in Fig. 4 of the drawings and at which times the word "Left" indicated at 36 upon a transparent window 37 in the rear face of the arm 10 will be right side up and readily readable rearwardly of the vehicle. Upon again depressing the lever 14 to its intermediate position, the arm 10 will be depressed and the lever 14 may be further lowered for swinging the arm 10 upwardly at the opposite extremity of its movement and pointed toward the right hand side of the vehicle, when desired, as indicated by dotted lines in Fig. 4. At such times, the word "Right" shown at 38 upon the window 39 in the rear side of the arm 10 will be right side up and readily readable.

Electric lamps 40 and 41 are provided in the arm 10 inwardly of the windows 37 and 38 respectively while electric switches 42 and 43 respectively, control the circuits for said lamps 40 and 41. These switches 42 and 43 are provided in suitable circuits with their respective lamps including a source of electrical supply such as the batteries 44 and are manually operable whenever desired in the nighttime. When the arm 10 is elevated for indicating a left hand turn, the left hand switch 42 may be closed for lighting the lamp 40 while in a similar manner, when the arm 10 indicates a right hand turn, the lamp 41 may be lighted by closing the right hand switch 43.

A readily viewable signal is provided for vehicles serviceable in preventing accidents by advising persons at the rear thereof regarding the intended future course of travel, the indicating means being readily viewable in the nighttime as well as in the day.

What I claim as new is:—

1. An indicator comprising a swinging semaphore arm, a vertically slidable rack intermediately positioned when the arm is in its normal vertical position and operating connections between the said rack and arm whereby the arm is adapted for upward swinging movement in either direction upon the vertical shifting of the rack.

2. A device of the class described comprising an upright, a shaft journaled in said upright, a semaphore arm secured to said shaft, a frame spaced from said upright, a pinion journaled in said frame, a vertically shiftable lever having a rack portion in constant mesh with said pinion, and operative connections between said pinion and shaft whereby the shaft and arm are adapted for partial rotation in either direction during the vertical shifting of the lever.

In testimony whereof I affix my signature.

JOSEPH SOBOCINSKI.